(12) United States Patent
Terahata (10) Patent No.: US 10,260,474 B2
(45) Date of Patent: Apr. 16, 2019

(54) CONTROL DEVICE FOR VEHICLE AND CONTROL METHOD FOR VEHICLE

(71) Applicant: TOYOTA JIDOSHA KABUSHIKI KAISHA, Toyota-shi (JP)

(72) Inventor: Katsuya Terahata, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/966,492

(22) Filed: Apr. 30, 2018

(65) Prior Publication Data

US 2018/0328330 A1 Nov. 15, 2018

(30) Foreign Application Priority Data

May 9, 2017 (JP) ................................. 2017-093307

(51) Int. Cl.
*F02N 11/08* (2006.01)
*B60H 1/32* (2006.01)

(52) U.S. Cl.
CPC ........... *F02N 11/084* (2013.01); *B60H 1/322* (2013.01); *F02N 11/0837* (2013.01); *B60H 2001/3263* (2013.01); *B60H 2001/3266* (2013.01); *F02N 2200/0806* (2013.01); *F02N 2200/125* (2013.01)

(58) Field of Classification Search
CPC ............... F02N 11/0837; F02N 11/084; F02N 2200/0806; B60H 1/322; B60W 30/181; B60W 30/18154

See application file for complete search history.

(56) References Cited

U.S. PATENT DOCUMENTS 6,330,909 B1 * 12/2001 Takahashi .............. B60H 1/005
165/202
6,688,120 B2 * 2/2004 Aoki ...................... B60H 1/005
62/133
8,656,889 B2 * 2/2014 Muta .................. B60H 1/00764
123/339.22

(Continued)

FOREIGN PATENT DOCUMENTS

JP 2009-298239 12/2009
JP 2011-068190 4/2011
JP 2012-047148 3/2012

*Primary Examiner* — Sizo B Vilakazi
*Assistant Examiner* — Kevin R Steckbauer
(74) *Attorney, Agent, or Firm* — Oblon, McClelland, Maier & Neustadt, L.L.P.

(57) ABSTRACT

A control device for a vehicle includes an electronic control unit. The electronic control unit is configured to: execute first automatic stop control for automatically stopping an engine when a first condition is established during traveling of the vehicle; execute second stop control for automatically stopping the engine when a second condition is established during stop of the vehicle; predict a vehicle stop duration; calculate a required cold and heat storage amount of an evaporator; calculate a reaching time until a cold and heat storage amount of the evaporator reaches the required cold and heat storage amount; predict a time needed for vehicle stop; and when the first condition is established during traveling of the vehicle, in a case where the calculated reaching time is equal to or longer than the predicted time needed for vehicle stop, automatically stop the internal combustion engine during traveling of the vehicle.

5 Claims, 6 Drawing Sheets

(56) References Cited

U.S. PATENT DOCUMENTS

| | | | | |
|---|---|---|---|---|
| 8,745,997 | B2 * | 6/2014 | Kumar | F25B 27/00 |
| | | | | 62/133 |
| 9,163,603 | B2 * | 10/2015 | Wakou | B60H 1/00778 |
| 2002/0134093 | A1 * | 9/2002 | Aoki | B60H 1/005 |
| | | | | 62/133 |
| 2003/0233835 | A1 * | 12/2003 | Tomita | B60H 1/005 |
| | | | | 62/133 |
| 2009/0043429 | A1 * | 2/2009 | Minekawa | F01P 5/04 |
| | | | | 701/1 |
| 2011/0067419 | A1 * | 3/2011 | Aoyagi | B60H 1/005 |
| | | | | 62/133 |
| 2011/0118954 | A1 * | 5/2011 | Muta | B60H 1/00764 |
| | | | | 701/102 |
| 2012/0304670 | A1 * | 12/2012 | Kumar | F25B 27/00 |
| | | | | 62/61 |
| 2013/0030679 | A1 * | 1/2013 | Wakou | B60H 1/00778 |
| | | | | 701/113 |
| 2016/0363060 | A1 * | 12/2016 | Shinohara | F02D 29/02 |

\* cited by examiner

CONTROL DEVICE FOR VEHICLE AND CONTROL METHOD FOR VEHICLE

INCORPORATION BY REFERENCE

The disclosure of Japanese Patent Application No. 2017-093307 filed on May 9, 2017 including the specification, drawings and abstract is incorporated herein by reference in its entirety.

BACKGROUND

1. Technical Field

The present disclosure relates to a control device for a vehicle and a control method for a vehicle.

2. Description of Related Art

In order to achieve improvement of a fuel consumption rate of an internal combustion engine (engine), so-called stop-and-start control (hereinafter, referred to as S&S control) for automatically stopping the engine when a predetermined automatic stop condition is established and for automatically restarting the engine when a predetermined automatic stop release condition is established in the above-described automatic engine stop state is executed.

As the S&S control, in addition to S&S control during vehicle stop (second stop control) for automatically stopping the engine during stop of the vehicle, S&S control during traveling (first automatic stop control) of the vehicle for, in a case where an accelerator off operation or the like is performed, shutting off power transmission between the engine and drive wheels and automatically stopping the engine to perform coasting (also referred to as coasting traveling) is known.

Japanese Unexamined Patent Application Publication No. 2009-298239 (JP 2009-298239 A) discloses that, in a vehicle mounted with air conditioning device having a so-called mechanical type compressor configured to operate with power of an engine, in an automatic engine stop state in S&S control during vehicle stop, when an evaporator temperature (an estimated temperature of a refrigerant in the evaporator) of the air conditioning device exceeds a predetermined value, the engine is automatically restarted to restart circulation of the refrigerant in a refrigerant circulation circuit of the air conditioning device. This is an operation of automatically restarting the engine in order to recover a cooling ability since, in a case where cooling operation of the air conditioning device is performed in the automatic engine stop state in the S&S control during vehicle stop, the temperature of the refrigerant increases with heat exchange between the refrigerant and air in the evaporator, and it is not possible to meet a cooling request.

SUMMARY

On the other hand, even in an automatic engine stop state in S&S control during traveling, the evaporator temperature during cooling operation increases. For this reason, in a case where the vehicle is stopped after the automatic engine stop in the S&S control during traveling, and the automatic engine stop in the S&S control during vehicle stop is performed, and in a case where the time for which the engine is automatically stopped by the S&S control during traveling until the vehicle is stopped is relatively long, the evaporator temperature increases during the time. For this reason, the cooling ability is insufficient during stop of the vehicle, and before the vehicle starts (before there is a start request of the driver), the engine may be automatically restarted in order to recover the cooling ability. In the situation described above, the engine is operated in the vehicle stop state, resulting in deterioration of the fuel consumption rate.

The disclosure provides a control device for a vehicle and a control method for a vehicle that can execute S&S control during traveling capable of preventing an engine from being automatically restarted during stop of the vehicle in S&S control during vehicle stop while meeting a cooling request.

A first aspect of the disclosure relates to a control device for a vehicle. The vehicle includes an internal combustion engine and an air conditioning device. The air conditioning device includes a compressor configured to compress a refrigerant with power of the internal combustion engine and an evaporator configured to perform heat exchange between the refrigerant and air. The control device includes an electronic control unit. The electronic control unit is configured to execute a first automatic stop control when a first condition is established during traveling of the vehicle. The first automatic stop control is a control for automatically stopping the internal combustion engine during traveling of the vehicle. The electronic control unit is configured to execute a second stop control when a second condition is established during stop of the vehicle. The second automatic stop control is a control for automatically stopping the internal combustion engine during stop of the vehicle. The electronic control unit is configured to, during traveling of the vehicle, predict a vehicle stop duration when the vehicle is stopped after traveling of the vehicle. The electronic control unit is configured to calculate a required cold and heat storage amount of the evaporator needed for maintaining the stop of the internal combustion engine over the entire period of the predicted vehicle stop duration. The electronic control unit is configured to, during traveling of the vehicle, calculate a reaching time until a cold and heat storage amount of the evaporator reaches the required cold and heat storage amount, when the internal combustion engine is automatically stopped. The electronic control unit is configured to, during traveling of the vehicle, predict a time needed for vehicle stop until the vehicle is stopped after traveling of the vehicle. The electronic control unit is configured to automatically stop the internal combustion engine during traveling of the vehicle, when the first condition is established during traveling of the vehicle and the calculated reaching time is equal to or longer than the predicted time needed for vehicle stop.

A second aspect of the disclosure relates to a control method for a vehicle. The vehicle includes an internal combustion engine, an air conditioning device, and an electronic control unit. The air conditioning device includes a compressor configured to compress a refrigerant with power of the internal combustion engine and an evaporator configured to perform heat exchange between the refrigerant and air. The control method includes: executing, by the electronic control unit, first automatic stop control for automatically stopping the internal combustion engine when a first condition is established during traveling of the vehicle; executing, by the electronic control unit, second stop control for automatically stopping the internal combustion engine when a second condition is established during stop of the vehicle; during traveling of the vehicle, predicting, by the electronic control unit, a vehicle stop duration when the vehicle is stopped after traveling of the vehicle; calculating, by the electronic control unit, a required cold and heat storage amount of the evaporator needed for maintaining the stop of the internal combustion engine over an entire period of the predicted vehicle stop duration; during traveling of the vehicle, calculating, by the electronic control unit, a reaching time until a cold and heat storage amount of the evaporator reaches the required cold and heat storage amount, when the internal combustion engine is automatically stopped; during traveling of the vehicle, predicting, by the electronic control unit, a time needed for vehicle stop until the vehicle is stopped after traveling of the vehicle; and automatically stopping, by the electronic control unit, the internal combustion engine during traveling of the vehicle, when the first condition is established during traveling of the vehicle and the calculated reaching time is equal to or longer than the predicted time needed for vehicle stop.

With the above-described specific matters, during traveling of the vehicle, the vehicle stop duration when the vehicle is stopped after traveling of the vehicle is predicted by the electronic control unit. The required cold and heat storage amount of the evaporator needed for maintaining the stop of the internal combustion engine over the entire period of the predicted vehicle stop duration is calculated by the electronic control unit. During traveling of the vehicle, in a case where the internal combustion engine is automatically stopped, the reaching time until the cold and heat storage amount of the evaporator reaches the required cold and heat storage amount is calculated by the electronic control unit. During traveling of the vehicle, the time needed for vehicle stop until the vehicle is stopped after traveling of the vehicle is predicted by the electronic control unit.

The electronic control unit automatically stops the internal combustion engine during traveling of the vehicle in a case where the calculated time is equal to or longer than the predicted time needed for vehicle stop when the first condition is established during traveling of the vehicle. That is, during traveling of the vehicle, even though the internal combustion engine is automatically stopped from the present time, thereafter, in a case where the cold and heat storage amount of the evaporator is maintained to be equal to or greater than the required cold and heat storage amount at the time of vehicle stop, determination is made that the stop of the internal combustion engine can be maintained over the entire period of the vehicle stop duration, and the internal combustion engine is automatically stopped. With the above description, the internal combustion engine is less likely to be automatically restarted in the vehicle stop state, and it is possible to achieve improvement of the fuel consumption rate while meeting the cooling request.

In the aspect of the disclosure, when the first condition is established during traveling of the vehicle, the calculated reaching time (during traveling of the vehicle, in a case where the internal combustion engine is automatically stopped, the reaching time until the cold and heat storage amount of the evaporator reaches the required cold and heat storage amount) is equal to or longer than the predicted time needed for vehicle stop (during traveling of the vehicle, the time needed for vehicle stop until the vehicle is stopped after traveling of the vehicle), the internal combustion engine is automatically stopped during traveling of the vehicle. With the above description, it is possible to maintain the stop of the internal combustion engine over the entire period of the vehicle stop duration (the internal combustion engine is less likely to be automatically restarted in the vehicle stop state), and it is possible to achieve improvement of the fuel consumption rate while meeting the cooling request.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described referring to the drawings. In the embodiment of the disclosure, a case where the disclosure is applied to a front engine/front drive (FF) type vehicle will be described.

Figure 1:
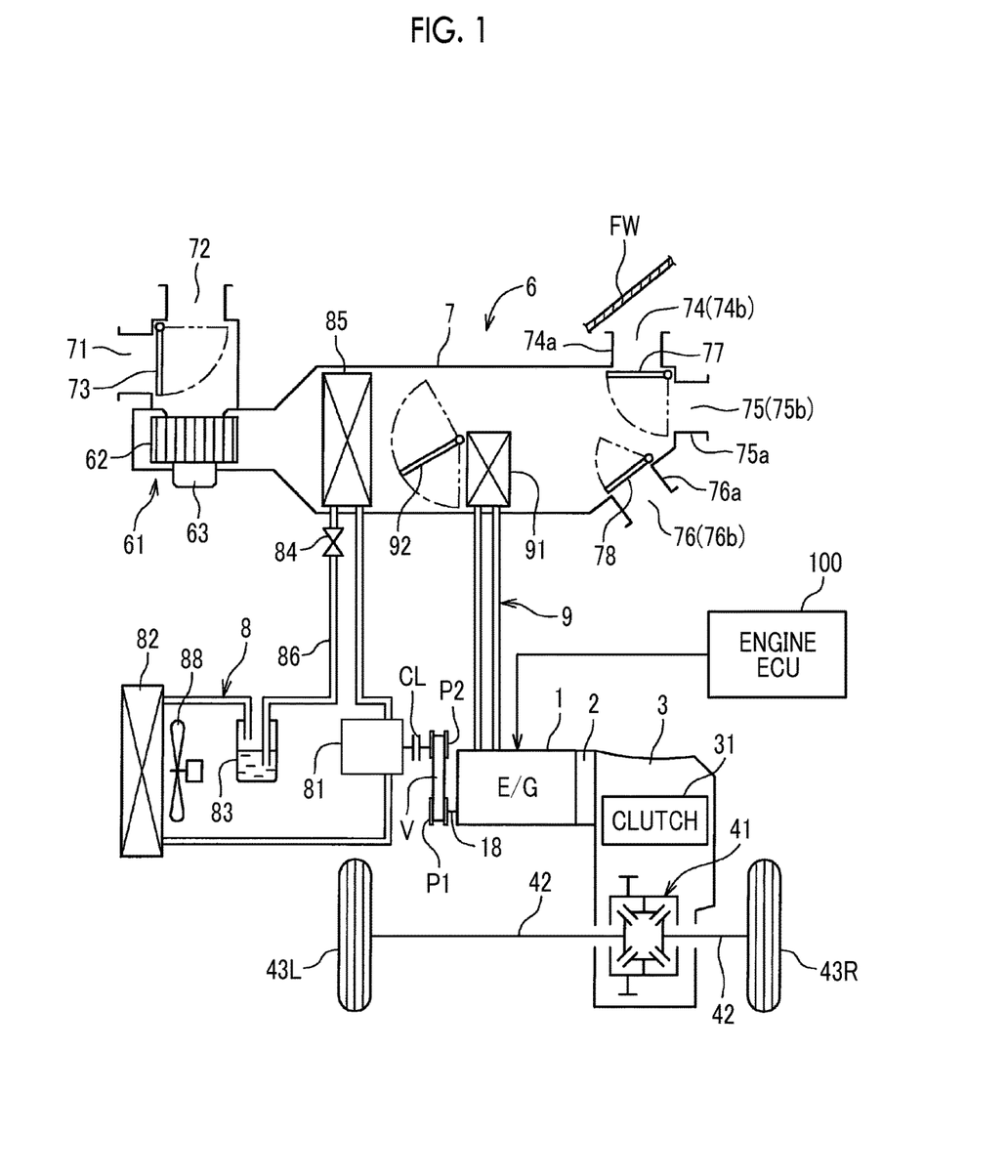
FIG. 1 is a diagram showing the schematic configuration of a power transmission system and an air conditioning control system of a vehicle according to an embodiment of the disclosure.

FIG. 1 is a diagram showing the schematic configuration of a power transmission system and an air conditioning control system of a vehicle according to the embodiment of the disclosure. Hereinafter, the power transmission system and the air conditioning control system will be specifically described.

Power Transmission System of Vehicle

As shown in FIG. 1, the power transmission system of the vehicle includes an engine (internal combustion engine) 1 that generates drive torque for traveling of the vehicle, a torque converter 2, an automatic transmission 3, a differential device 41 for front wheels, front wheel axles (front drive shaft) 42, and front wheels (drive wheels) 43L, 43R. An output of the engine 1 is transmitted to the differential device 41 through the torque converter 2 and the automatic transmission 3, and is distributed to the right and left drive wheels 43R, 43L.

The engine 1 is a drive power source for traveling, and is, for example, a multi-cylinder gasoline engine. The engine 1 is configured to control an operation state with an opening degree (intake air amount) of a throttle valve, a fuel injection amount from an injector, an ignition timing of an ignition plug, and the like. The operation state of the engine 1 is controlled by an engine electronic control unit (ECU) 100.

The automatic transmission 3 is provided in a power transmission path between the engine 1 and the drive wheels 43L, 43R, and is configured to change rotation of an input shaft and output the rotation to an output shaft. In the automatic transmission 3, the input shaft is coupled to the engine 1 (coupled through the torque converter 2), and the output shaft is coupled to the drive wheels 43L, 43R through the differential device 41 or the like. The automatic transmission 3 includes a plurality of clutches and brakes as frictional engagement elements for selectively switching a gear shift stage. In FIG. 1, solely a clutch (input clutch) 31 provided in the input shaft configured to receive power from the engine 1 among the frictional engagement elements is shown. The engine 1 and the drive wheels 43L, 43R are selectively coupled by the clutch 31 through the automatic transmission 3. Specifically, in a case where the clutch 31 is engaged, power transmission between the engine 1 and the drive wheels 43L, 43R is enabled (power transmission is enabled in a state in which other clutches and brakes are selectively engaged and a predetermined gear shift stage is established), and in a case where the clutch 31 is released, power transmission between the engine 1 and the drive wheels 43L, 43R is shut off.

Air Conditioning Control System

The air conditioning control system will be described. In the air conditioning control system, automatic control for maintaining a temperature inside a vehicle cabin at a set temperature is enabled by controlling each actuator or the like of an air conditioner unit (air conditioning device) 6 configured to perform air-conditioning (to condition air) in the vehicle cabin with an air conditioner ECU 200 (see FIG. 2).

As shown in FIG. 1, the air conditioner unit (air conditioning unit) 6 includes an air conditioning duct 7 that forms an air passage for guiding air-conditioning air in the vehicle cabin, a centrifugal blower (blower for air-conditioning) 61 that generates an airflow in the air conditioning duct 7, a refrigerant circulation circuit 8 that cools air flowing in the air conditioning duct 7 to cool the inside of the vehicle cabin, and a coolant circuit 9 that heats air flowing in the air conditioning duct 7 to heat the inside of the vehicle cabin, and the like.

An uppermost stream side (windward side) of the air conditioning duct 7 is a portion that constitutes an inlet port switch box (inside/outside air switch box), and has an inside air inlet port 71 that takes air in the vehicle cabin, and an outside air inlet port 72 that takes air outside the vehicle cabin.

Inside the inside air inlet port 71 and the outside air inlet port 72, an inside/outside air switch door 73 is attached rotatably. The inside/outside air switch door 73 is driven by an actuator 73a (FIG. 2), such as a servo motor, and switches an inlet port mode between an inside air circulation mode and an outside air introduction mode.

A lowermost stream side (leeward side) of the air conditioning duct 7 is a portion that constitutes an outlet port switch box, and has a defroster (DEF) opening 74, a face (FACE) opening 75, and a foot (FOOT) opening 76.

The DEF opening 74 is provided with a defroster duct 74a, and a defroster (DEF) outlet port 74b that blows out air-conditioning air toward the inner surface of a windshield FW of the vehicle is formed at a lowermost stream end of the defroster duct 74a.

The FACE opening 75 is provided with a face duct 75a, and a face (FACE) outlet port 75b that blows out air-conditioning air toward a head and a chest of an occupant is formed at a lowermost stream end of the face duct 75a.

The FOOT opening 76 is provided with a foot duct 76a, and a foot (FOOT) outlet port 76b that blows out air-conditioning air toward a foot of the occupant is formed at a lowermost stream end of the foot duct 76a.

Inside the outlet ports 74b, 75b, 76b, outlet port switch doors 77, 78 are attached rotatably. The outlet port switch doors 77, 78 are driven by actuators 77a, 78a (FIG. 2), such as a servo motor, respectively, and switch an outlet port mode to one of a face (FACE) mode, a bi-level (B/L) mode, a foot (FOOT) mode, a foot defroster (F/D) mode, and a defroster (DEF) mode.

The centrifugal blower 61 has a blower 62 that is rotatably accommodated in a scroll case integrated with the air conditioning duct 7, and a blower motor 63 that rotationally drives the blower 62.

Figure 2:
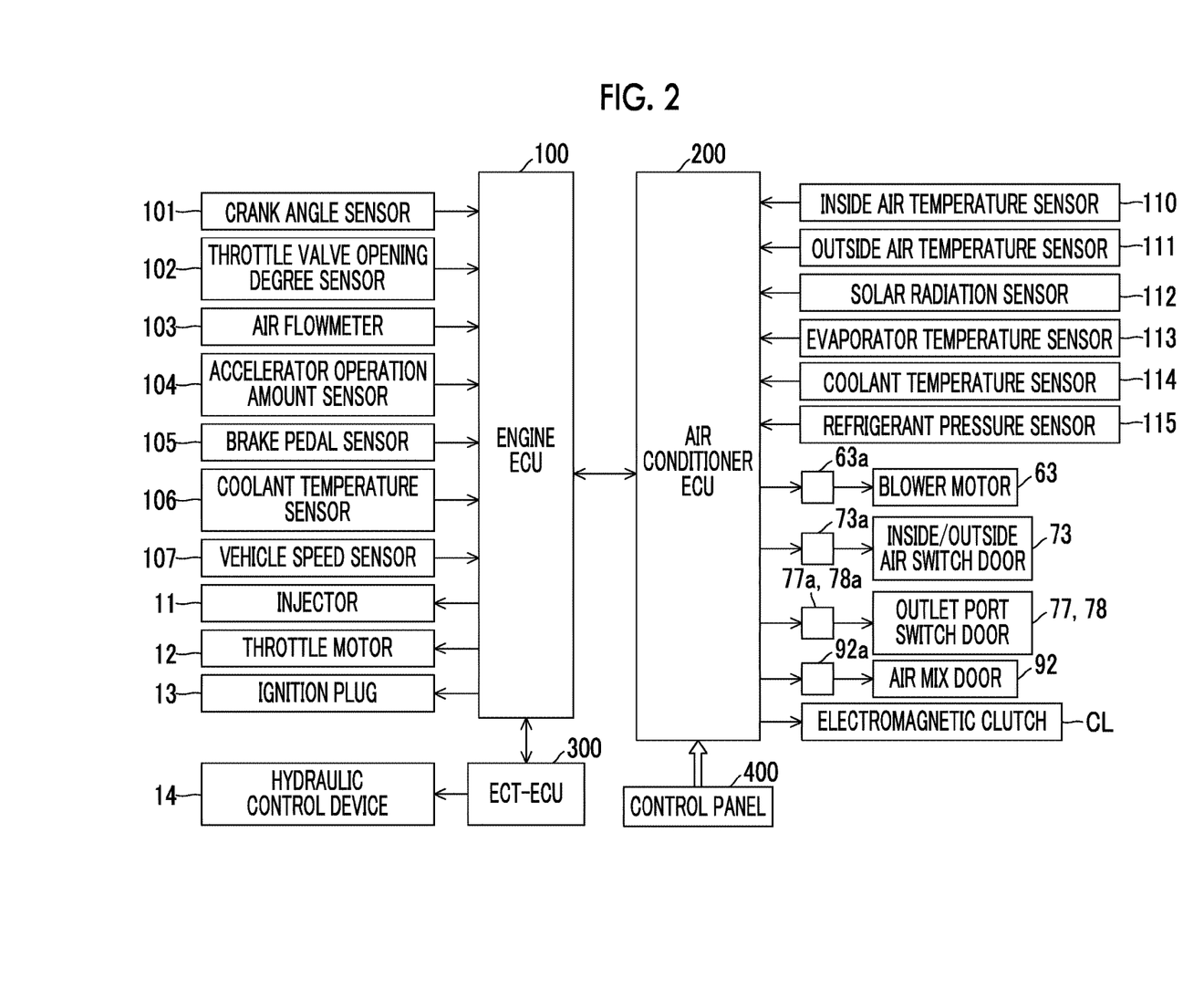
FIG. 2 is a schematic configuration diagram showing a control block including each ECU.

In the blower motor 63, a blower air amount (a rotation speed of the blower 62) is controlled based on a blower terminal voltage applied through a blower drive circuit 63a (FIG. 2).

The refrigerant circulation circuit 8 is constituted of a compressor 81, a condenser 82 into which a refrigerant ejected from an ejection port of the compressor 81 flows, a receiver (liquid receiver, air-liquid separator) 83 that separates the condensed and liquefied refrigerant into air and liquid and flows solely a liquid refrigerant to the downstream, an expansion valve (expansion valve, decompression means) 84 that decompresses and expands the liquid refrigerant, an evaporator (refrigerant evaporator) 85 that evaporates and vaporizes the decompressed and expanded refrigerant, a refrigerant pipe 86 that connects the constitute elements in an annular shape, and the like.

The evaporator 85 is provided in the air conditioning duct 7 so as to cover the substantially entire surface of the air passage.

The compressor 81 compresses and ejects the taken refrigerant, and is driven with power from the engine 1. Specifically, an accessory belt V is stretched between a crank pulley P1 attached to a crankshaft 18 of the engine 1 and an accessory pulley P2 attached to a drive shaft of the compressor 81 through the electromagnetic clutch CL. In an ON state (fastened state) in which electric power is supplied to the electromagnetic clutch CL, the power from the engine 1 is transmitted to the compressor 81 through the accessory belt V. The power of the engine 1 is transmitted to the compressor 81, whereby the refrigerant is circulated in the refrigerant circulation circuit 8, and cooling of air is performed with evaporation and vaporization of the refrigerant in the evaporator 85. In an OFF state of the electromagnetic clutch CL, the power of the engine 1 is not transmitted to the compressor 81, and the circulation of the refrigerant in the refrigerant circulation circuit 8 is stopped. Even in an automatic engine stop state in S&S control described below, the circulation of the refrigerant in the refrigerant circulation circuit 8 is stopped.

The condenser 82 is a refrigerant condenser that condenses and liquefies the refrigerant compressed by the compressor 81. Specifically, the condenser 82 performs heat exchange between outside air and traveling air (at the time of traveling of the vehicle) blown from a cooling fan (outdoor fan) 88 and the refrigerant.

The coolant circuit 9 is a circuit that circulates a coolant heated in a water jacket of the engine 1 with a water pump (not shown), and has a heater core 91.

An engine coolant flows inside the heater core 91, and the heater core 91 heats air with the engine coolant as a heat source for heating. The coolant circuit 9 is provided with, in addition to the heater core 91, a radiator that emits heat of the engine coolant to the atmosphere, a thermostat that switching a circulation path of the coolant, and the like (all are not shown). The configurations of the elements are known, and thus, description thereof will not be repeated.

The heater core 91 is provided downstream of the evaporator 85 in the air conditioning duct 7 so as to partially cover the air passage.

On an upstream side of the heater core 91, an air mix (A/M) door 92 is attached rotatably. The A/M door 92 is driven by an actuator 92a (FIG. 2), such as a servo motor, and adjusts the temperature of air blown out into the vehicle cabin by changing the ratio of the amount of air passing through the heater core 91 to the amount of air bypassing the heater core 91 by a stop position between a MAX COOL position where the whole air is made to bypass the heater core 91 and a MAX HOT position where the whole air passes through the heater core 91.

ECU

FIG. 2 is a schematic configuration diagram showing a control block including the engine ECU 100, the air conditioner ECU 200, and an electronic controlled transmission (ECT)-ECU 300.

The engine ECU 100 drives the engine 1 by controlling an air-fuel mixture supplied to the engine 1 or a combustion timing according to a traveling situation of the vehicle. The air conditioner ECU 200 performs control of each actuator or the like of the air conditioner unit 6 according to an air conditioning request in the vehicle cabin. The ECT-ECU 300 performs engagement and release of the clutch 31 through gear shift control of the automatic transmission 3 or stop-and-start (S&S) control described below.

The engine ECU 100, the air conditioner ECU 200, and the ECT-ECU 300 are connected to transmit and receive information needed for engine control, air conditioning control, and gear shift control.

Though not shown, each of the ECUs 100, 200, 300 is generally constituted of a known electronic control unit (ECU), and includes a central processing unit (CPU), a read only memory (ROM), a random access memory (RAM), a backup RAM, and the like.

In the ROM, various control programs, a map that is referred when various control programs are executed, and the like are stored. The CPU performs calculation processing based on various control programs or the map stored in the ROM. The RAM is a memory that temporarily stores a calculation result in the CPU, data input from each sensor, and the like, and the backup RAM is a nonvolatile memory that stores data or the like to be saved at the time of stop of the engine 1.

As shown in FIG. 2, various sensors, such as a crank angle sensor 101 that detects a rotation angle (crank angle CA) of the crankshaft 18 of the engine 1, a throttle valve opening degree sensor 102 that detects an opening degree of a throttle valve, an air flowmeter 103 that detects an intake air amount, an accelerator operation amount sensor 104 that an operation amount (accelerator pedal depression amount) of an accelerator pedal, a brake pedal sensor 105 that detects an operation amount (brake pedal depression amount) of a brake pedal, a coolant temperature sensor 106 that detects a coolant temperature of the engine 1, and a vehicle speed sensor 107 that detects a vehicle speed, are connected to the engine ECU 100, and signals of the sensors are input to the engine ECU 100.

The engine ECU 100 controls a fuel injection amount or a fuel injection timing of an injector 11, an opening degree of a throttle valve adjusted by a throttle motor 12, an ignition timing of an ignition plug 13 based on detection results of the sensors, or the like.

Switch signals from various switches on an instrument panel 400 provided in a front surface of the vehicle cabin and sensor signals from various sensors are input to the air conditioner ECU 200.

As various switches provided on the instrument panel 400, an air conditioner (A/C) switch, an inlet port selection switch for switching the inlet port mode, a temperature setting switch for setting a temperature inside the vehicle cabin at a desired temperature, an air amount selection switch for setting an air blow amount from the blower 62 in a manual mode, an outlet port selection switch for switching the outlet port mode, and the like are provided.

As various sensors connected to the air conditioner ECU 200, there are an inside air temperature sensor 110 that detects an air temperature inside the vehicle cabin, an outside air temperature sensor 111 that detects an air temperature outside the vehicle cabin, a solar radiation sensor 112 that detects the amount of solar radiation irradiated inside the vehicle cabin, an evaporator temperature sensor 113 that detects a temperature of the evaporator 85, a coolant temperature sensor 114 that detects a temperature of the engine coolant flowing into the heater core 91, a refrigerant pressure sensor 115 that detects high pressure (condensing pressure, ejection pressure) of the refrigerant circulation circuit 8, and the like. The evaporator temperature sensor 113 is intended to detect the temperature of the refrigerant inside the evaporator 85, and a sensor that is provided inside the evaporator 85 to directly detect the temperature of the refrigerant, a sensor that is attached to an outer surface of the refrigerant pipe of the evaporator 85 to detect a temperature of the outer surface of the refrigerant pipe, a sensor that is attached to a heat exchange fin evaporator 85 to detect a temperature of the heat exchange fin, or the like is applied.

The actuators 73a, 77a, 78a, 92a, the blower drive circuit 63a, and the electromagnetic clutch CL are connected to the air conditioner ECU 200, and the air conditioner ECU 200 performs control of the elements according to the air conditioning request in the vehicle cabin.

A hydraulic control device 14 provided in a hydraulic circuit of the automatic transmission 3 is connected to the ECT-ECU 300. The ECT-ECU 300 is configured to execute the gear shift control of the automatic transmission 3 by performing control of the hydraulic control device 14. The ECT-ECU 300 is also configured to execute S&S control described below by controlling the engagement state of the clutch 31.

Inter-Vehicle Communication System

The vehicle according to the embodiment of the disclosure is configured to perform communication (transmission and reception of information) with other vehicles. Hereinafter, an inter-vehicle communication system that performs communication will be described.

Figure 3:
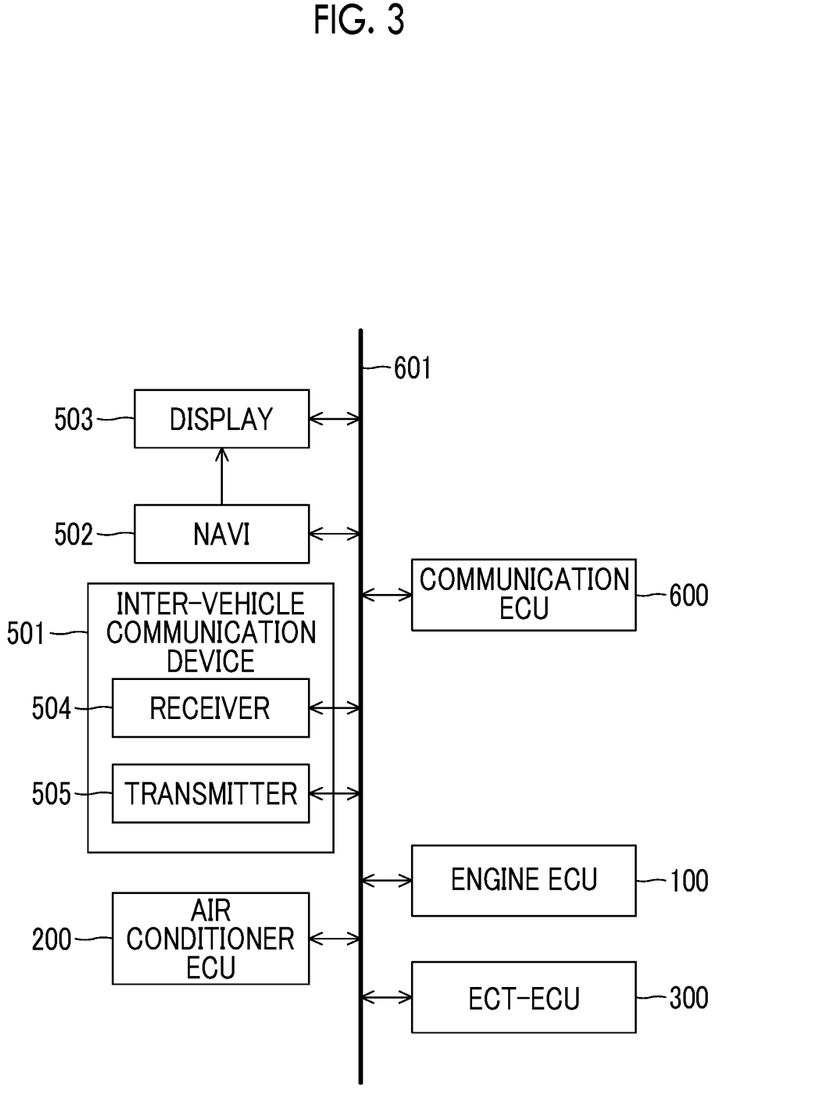
FIG. 3 is a block diagram showing the schematic configuration of an in-vehicle system for performing inter-vehicle communication.

FIG. 3 is a block diagram showing the schematic configuration of an in-vehicle system that performs inter-vehicle communication.

The in-vehicle system includes an inter-vehicle communication device 501 that performs transmission and reception of traveling state information or the like between the host vehicle and other vehicles through wireless communication. The in-vehicle system includes a car navigation system (NAVI) 502 that acquires road information, intersection information, position information of the host vehicle, and traveling speed information of the host vehicle, to guide the vehicle to a destination, a communication ECU 600 that performs estimation of a lighting state (lamp color) of a traffic signal provided at an intersection in front of a road based on traveling state information of other vehicles acquired by the inter-vehicle communication device 501, intersection information acquired by the car navigation system 502, a display 503 that presents lamp color information of the traffic signal estimated by the communication ECU 600, and the like to the driver.

The inter-vehicle communication device 501 has a receiver 504 that receives traveling state information of other vehicles transmitted from other vehicles, for example, traveling positions, traveling speeds, blinker information, brake information, accelerator information, and the like of other vehicles, and a transmitter 505 that transmits the lamp color of the traffic signal estimated by the communication ECU 600, a switching cycle of the lamp color, or the like to other vehicles.

The inter-vehicle communication device 501 is set to perform wireless communication with other vehicles within a range of several hundreds of meters radius (for example, about 400 meters).

The inter-vehicle communication device 501 and the communication ECU 600 are connected by a communication line 601, such as a controller area network (CAN), and are configured to exchange data to each other. The engine ECU 100, the air conditioner ECU 200, and the ECT-ECU 300 are also connected to the communication line 601.

The traveling state information of other vehicles received by the inter-vehicle communication device 501 (receiver 504) is transmitted to the communication ECU 600 through the communication line 601. Information regarding the lamp color of the traffic signal estimated by the communication ECU 600, the switching cycle of the lamp color, or the like is transmitted to the inter-vehicle communication device 501 (transmitter 505) through the communication line 601. Information regarding the lamp color of the traffic signal, the switching cycle of the lamp color, or the like may be received from an optical beacon provided adjacent to the traffic signal. Various kinds of information may be received from a base station provided outside the vehicle by a communication function.

The communication ECU 600 is also connected to the car navigation system 502 through the communication line 601. The car navigation system 502 detects a position of the host vehicle based on GPS satellite signals received from a global positioning system (GPS) receiver. A traveling distance is calculated based on a vehicle speed signal, and a vehicle moving direction is detected according to a signal from a gyro sensor. The car navigation system 502 acquires road information, such as a lane configuration, arrangement of intersections or traffic signals, and a road curvature, from an embedded hard disk, a DVD disc, or the like. The acquire road information, the position of the host vehicle, and the like are transmitted to the communication ECU 600 through the communication line 601.

The car navigation system 502 has a liquid crystal display (hereinafter, simply referred to as a "display") 503 that displays the road information, the position of the host vehicle, and the like. The display 503 is also connected to the communication ECU 600 through the communication line 601, and displays lighting state information of a traffic signal estimated by the communication ECU 600, a recommended speed for allowing the vehicle to smoothly pass through an intersection, and the like.

Similarly to the ECUs 100, 200, 300, the communication ECU 600 includes a CPU, a ROM, a RAM, a backup RAM, and the like.

S&S Control

The S&S control will be described. The vehicle according to the embodiment of the disclosure can perform, as the S&S control, S&S control during vehicle stop (second stop control) for automatically stopped the engine 1 during stop of the vehicle, and in a case where an accelerator off operation or the like is performed during traveling of the vehicle, S&S control during traveling (first automatic stop control) for shutting off power transmission between the engine 1 and the drive wheels 43L, 43R and automatically stopping the engine 1 to execute coasting traveling. Hereinafter, each control will be described.

S&S Control During Vehicle Stop

The S&S control during vehicle stop is to automatically stop the engine 1 in a case where an second condition (in other words, an idle reduction control condition) is established in the vehicle stop state and to automatically restart the engine 1 in a case where an automatic stop release condition during vehicle stop (stop-start release condition) is established.

The second condition is set so as to include, for example, a condition that the accelerator is off (the operation amount of the accelerator pedal is zero), a condition that the brake operation amount is equal to or greater than a predetermined determination threshold, and a condition that the vehicle speed is substantially zero. Determination about whether or not the accelerator is off is performed according to an output signal from the accelerator operation amount sensor 104. Determination about whether or not the brake operation amount becomes equal to or greater than the predetermined determination threshold is performed according to an output signal from the brake pedal sensor 105. Determination about whether or not the vehicle speed is substantially zero is performed according to an output signal from the vehicle speed sensor 107.

In a case where the second condition is established, the engine ECU 100 outputs a fuel injection stop command to the injector 11 and stops fuel injection (fuel cut-off) to automatically stop the engine 1. In addition to the fuel cut-off, ignition cut may be performed.

The automatic stop release condition during vehicle stop is set so as to include a condition that, in a state in which the engine 1 is automatically stopped accompanied with the establishment of the second condition, the depression of the brake pedal is eased up, and the brake operation amount becomes smaller than the predetermined determination threshold. In a case where the automatic stop release condition during vehicle stop is established in a state in which the engine 1 is automatically stopped, the engine ECU 100 outputs an engine restart command to the ignition plug 13, the injector 11, and a starter motor (not shown), starts an ignition operation of the ignition plug 13 and fuel injection from the injector 11, and operates the starter motor to perform cranking of the engine 1, thereby automatically restarting the engine 1.

S&S Control During Traveling

The S&S control during traveling is to release the clutch 31 with the hydraulic control device 14 and automatically stop the engine 1 in a case where the first condition (coasting traveling execution condition) is established in a vehicle traveling state, and to engage the clutch 31 with the hydraulic control device 14 and automatically restart the engine 1 in a case where the automatic stop release condition during traveling (coasting traveling release condition) is established.

The first condition is set so as to include, for example, a condition that the accelerator is off, a condition that the brake is off (the operation amount of the brake pedal is zero), and a condition that the vehicle speed is equal to or higher than a predetermined value. Similarly to the above-described second condition, determination about whether or not the accelerator is off is performed according to the output signal from the accelerator operation amount sensor 104. Determination about whether or not the brake is off is performed according to the output signal from the brake pedal sensor 105. Determination about whether or not the vehicle speed becomes equal to or higher than the predetermined value is performed according to the output signal from the vehicle speed sensor 107.

In a case where the first condition is established, the ECT-ECU 300 outputs a clutch release command to the hydraulic control device 14 and releases the clutch 31. The engine ECU 100 outputs the fuel injection stop command to the injector 11 and stops fuel injection (fuel cut-off) to automatically stop the engine 1. In addition to the fuel cut-off, ignition cut may be performed.

The automatic stop release condition during traveling is set so as to include, for example, a condition that an accelerator on operation is performed, a condition that a brake on operation is performed, and a condition that the vehicle speed decreases to be lower than the predetermined value, in a state in which coasting traveling is executed accompanied with the establishment of the first condition. That is, in a case where any one of the conditions is established, determination is made that the automatic stop release condition during traveling is established and coasting traveling is released. Specifically, in a case where the automatic stop release condition during traveling is established in a state in which coasting traveling is executed, the ECT-ECU 300 outputs a clutch engagement command to the hydraulic control device 14 and engages the clutch 31. The engine ECU 100 outputs the engine restart command to the ignition plug 13, the injector 11, and the starter motor (not shown), starts the ignition operation of the ignition plug 13 and fuel injection from the injector 11, and operates the starter motor to perform cranking of the engine 1, thereby automatically restarting the engine 1. The automatic stop release condition during traveling may not include the brake on operation. That is, in a state in which coasting traveling is executed, even though the brake on operation is performed, coasting traveling may be continued until the vehicle speed decreases to be lower than the predetermined value.

Determination on Execution of S&S Control During Traveling

In the vehicle in which the S&S control during vehicle stop and the S&S control during traveling described above can be executed, in the automatic engine stop state in the S&S control during traveling as well as the automatic engine stop state in the S&S control during vehicle stop, the evaporator temperature during cooling operation increases. That is, in a case where the cooling operation is performed in the automatic engine stop state in the S&S control during traveling, the temperature of the refrigerant increases with heat exchange between the refrigerant and air in the evaporator 85. An increase rate of the evaporator temperature in the automatic engine stop state in the S&S control during traveling is higher than an increase rate of the evaporator temperature in the automatic engine stop state in the S&S control during vehicle stop. The reason is, for example, because the amount of air flowing into the evaporator 85 increases due to the influence of traveling air in the outside air introduction mode during traveling.

For this reason, in a case where the vehicle is stopped after the automatic engine stop in the S&S control during traveling, and the automatic engine stop in the S&S control during vehicle stop is performed, and in a case where the time for which the engine is automatically stopped by the S&S control during traveling is relatively long during traveling until the vehicle is stopped, the evaporator temperature increases during the time, the cooling ability is insufficient during stop of the vehicle, and before the vehicle starts (before there is a start request of the driver), the engine is automatically restarted in order to recover the cooling ability. In the situation described above, the engine is operated in the vehicle stop state, resulting in deterioration of the fuel consumption rate.

In the embodiment of the disclosure, the S&S control during traveling capable of preventing the engine from being automatically restarted during stop of the vehicle in the S&S control during vehicle stop while meeting a cooling request is performed.

Hereinafter, the S&S control during traveling will be described in connection with a plurality of embodiments.

First Embodiment

The outline of S&S control during traveling in a first embodiment is as follows.

During traveling of the vehicle (during traveling of the vehicle in a state in which the engine 1 is operated), a vehicle stop duration when the vehicle is stopped after traveling of the vehicle is predicted. The vehicle stop duration is the time from when the vehicle is stopped until the vehicle starts, and is, for example, a traffic signal waiting time in a case where the vehicle is stopped at an intersection with a traffic signal. The vehicle stop duration is predicted based on the lamp color of the traffic signal or the switching cycle of the lamp color described above, the position information of the host vehicle (the position information of the host vehicle for acquiring distance information to the intersection with the traffic signal), the vehicle speed information of the host vehicle (the vehicle speed information of the host vehicle for calculating the time needed until the host vehicle reaches the intersection with the traffic signal), position information of other vehicles (position information of other vehicles for acquiring information regarding the number of other vehicles (preceding vehicles) that are stopped or may be stopped at a stop line of the intersection), and the like. For this reason, the longer the switching cycle of the lamp color of the traffic signal, the longer the vehicle stop duration tends to become, the shorter the time needed until the host vehicle reaches an intersection with a traffic signal in a case where the lamp color of the traffic signal in front is "red", the longer the vehicle stop duration tends to become, and the larger the number of preceding vehicles that are stopped at the stop line of the intersection, the longer the vehicle stop duration tends to become.

A required cold and heat storage amount of the evaporator 85 needed for maintaining the stop of the engine 1 over the entire period of the predicted vehicle stop duration described above is calculated. Specifically, the temperature of the evaporator 85 is detected as a value having a correlation with a cold and heat storage amount of the evaporator 85 when the vehicle is stopped. As the temperature of the evaporator 85, an upper limit temperature needed for maintaining the stop of the engine 1 over the entire period of the vehicle stop duration. That is, in a case where the temperature of the evaporator 85 when the vehicle is stopped is equal to or lower than the upper limit temperature, it is possible to maintain the stop of the engine 1 over the entire period of the vehicle stop duration is calculated. That is, in the engine stop state in the S&S control during vehicle stop, the temperature of the evaporator 85 increases; however, in a case where the temperature of the evaporator 85 when the vehicle is stopped is equal to or lower than the upper limit temperature, the temperature of the evaporator 85 during stop of the vehicle does not reach the temperature at which the engine 1 is automatically restarted (the evaporator temperature at which the engine 1 is automatically restarted in order to recover the cooling ability). For this reason, the upper limit temperature (the upper limit temperature needed for maintaining the stop of the engine 1 over the entire period of the vehicle stop duration) is obtained as a lower value when the vehicle stop duration is longer.

During traveling of the vehicle, in a case where the engine 1 is automatically stopped, a reaching time until the cold and heat storage amount of the evaporator 85 reaches the required cold and heat storage amount is calculated. Specifically, during traveling of the vehicle, in a case where it is assumed that the engine 1 is automatically stopped by the S&S control during traveling from the present time, the time until the temperature of the evaporator 85 reaches the upper limit temperature (the upper limit temperature needed for maintaining the stop of the engine 1 over the entire period of the vehicle stop duration) is calculated. For this reason, the higher the current evaporator temperature, the shorter the time tends to become, and the lower the upper limit temperature (the upper limit temperature needed for maintaining the stop of the engine 1 over the entire period of the vehicle stop duration), the shorter the time tends to become.

During traveling of the vehicle, a time needed for vehicle stop until the vehicle is stopped after traveling of the vehicle is predicted. The time needed for vehicle stop is predicted based on the lamp color of the traffic signal or the switching cycle of the lamp color described above, the position information of the host vehicle (the position information of the host vehicle for acquiring the distance information at the intersection with the traffic signal), the vehicle speed information of the host vehicle (the vehicle speed information of the host vehicle for calculating the time needed until the host vehicle reaches the intersection with the traffic signal), the position information of other vehicles (the position information of other vehicles for acquiring information regarding the number of other vehicles (preceding vehicles) that are stopped or may be stopped at the stop line of the intersection), and the like. For this reason, the longer the distance to the intersection with the traffic signal, the longer the time needed for vehicle stop tends to become, the lower the vehicle speed of the host vehicle, the longer the time needed for vehicle stop tends to become, and the smaller the number of preceding vehicles that are stopped at the stop line of the intersection, the longer the time needed for vehicle stop tends to become.

When the first condition is established during traveling of the vehicle, in a case where the reaching time until the cold and heat storage amount of the evaporator 85 reaches the required cold and heat storage amount is equal to or longer than the time needed for vehicle stop, the engine 1 is automatically stopped during traveling of the vehicle. Specifically, in a case where the time until the temperature of the evaporator 85 reaches the upper limit temperature is equal to or longer than the time needed for vehicle stop, the engine 1 is automatically stopped during traveling of the vehicle.

With the above description, during traveling of the vehicle, even though the engine 1 is automatically stopped from the present time, thereafter, in a case where the cold and heat storage amount of the evaporator 85 when the vehicle is stopped is maintained to be equal to or greater than the required cold and heat storage amount, determination is made that the stop of the engine 1 can be maintained over the entire period of the vehicle stop duration, and the engine 1 is automatically stopped. With this, it is possible to reduce a possibility that the engine 1 is automatically restarted in the vehicle stop state.

The above operations are performed by the ECUs 100, 200, 300, 600. Each of the ECUs 100, 200, 300, 600 predicts the vehicle stop duration (during traveling of the vehicle, predicts the vehicle stop duration when the vehicle is stopped after traveling of the vehicle), calculates the required cold and heat storage amount of the evaporator 85 (calculates the required cold and heat storage amount of the evaporator needed for maintaining the stop of the internal combustion engine over the entire period of the predicted vehicle stop duration), calculates the reaching time until the cold and heat storage amount of the evaporator 85 reaches the required cold and heat storage amount (during traveling of the vehicle, in a case where the internal combustion engine is automatically stopped, calculates the reaching time until the cold and heat storage amount of the evaporator reaches the required cold and heat storage amount), predicts the time needed for vehicle stop (during traveling of the vehicle, predicts the time needed for vehicle stop until the vehicle is stopped after traveling of the vehicle), and automatically stops the engine 1 during traveling of the vehicle (when the first condition is established during traveling of the vehicle, in a case where the calculated reaching time is equal to or longer than the predicted time needed for vehicle stop, automatically stops the internal combustion engine during traveling of the vehicle).

A procedure of the S&S control in the first embodiment will be described along a flowchart of FIG. 4. The flowchart is executed repeatedly at every predetermined time after a start switch of the vehicle is operated to be turned on.

In Step ST1, determination is made whether or not the vehicle is traveling currently. The determination is performed based on the output signal from the vehicle speed sensor 107.

In a case where the vehicle is stopped, and determination is made to be NO in Step ST1, determination is made that there is no need to determine whether or not to permit automatic stop of the engine 1 in the S&S control during traveling, and the process is returned as it is.

In a case where the vehicle is traveling, and determination is made to be YES in Step ST1, the process progresses to Step ST2, and determination is made whether or not the first condition (the accelerator is off, the brake is off, and the vehicle speed is equal to or higher than the predetermined value) is established.

In a case where the first condition is not established, and determination is to be NO in Step ST2, the process progresses to Step ST3, and coasting traveling is prohibited. That is, the engagement of the clutch 31 and the operation of the engine 1 are continuously returned.

In a case where the first condition is established, and determination is made to be YES in Step ST2, the process progresses to Step ST4, and the vehicle stop duration (traffic signal waiting time) ti at the time of the next vehicle stop is predicted. In predicting the vehicle stop duration ti, as described above, prediction is performed based on the lamp color of the traffic signal or the switching cycle of the lamp color, the position information of the host vehicle, the vehicle speed information of the host vehicle, the position information of other vehicles, and the like acquired by the inter-vehicle communication system.

That is, the position information of the host vehicle is used to acquire the distance information to the intersection with the traffic signal, the time needed until the host vehicle reaches the intersection is calculated based on the current position and vehicle speed of the host vehicle, in a case where the host vehicle reaches the intersection after the time elapses, estimation is made whether or not the lamp color of the traffic signal is "red", and in a case where the lamp color of the traffic signal is "red", the time from when the vehicle is stopped until the lamp color of the traffic signal is switched to "green" is estimated.

Specifically, in a case where the time (time needed for vehicle stop) needed until the host vehicle reaches the intersection is represented as ts, and the time until the lamp color of the traffic signal is switched to "green" from the present time is represented as tc, the vehicle stop duration ti is calculated by Expression (1).

$$ti = tc - ts + C \tag{1}$$

Here, "C" is a correction amount of a stop position of the host vehicle, and is determined, for example, according to the number of other vehicles (preceding vehicles) that are stopped or may be stopped at the stop line of the intersection. That is, in a case where the host vehicle is stopped and waits for the traffic signal to change, even though the lamp color of the traffic signal is switched to "green", the timing at which the host vehicle starts changes with the number of preceding vehicles stopped. That is, the vehicle stop duration ti changes. For this reason, the number of preceding vehicles stopped is considered based on the position information of other vehicles, and the vehicle stop duration ti is corrected by the correction amount C. That is, the larger the number of preceding vehicles stopped, the larger the value of the correction amount C.

Time is needed for vehicle stop is predicted based on the lamp color of the traffic signal or the switching cycle of the lamp color, the position information of the host vehicle, the vehicle speed information of the host vehicle, the position information of other vehicles, and the like acquired by the inter-vehicle communication system. That is, the position information of the host vehicle is used to acquire the distance information to the intersection with the traffic signal, the time needed until the host vehicle reaches the intersection is calculated based on the current position and vehicle speed of the host vehicle, and in a case where the host vehicle reaches the intersection after the time elapses, estimation is made whether or not the lamp color of the traffic signal is "red". Time tc until the lamp color of the traffic signal is switched to "green" from the present time is predicted based on the lamp color of the traffic signal or the switching cycle of the lamp color acquired by the inter-vehicle communication system.

After the vehicle stop duration ti at the time of the next vehicle stop is predicted in the above-described manner, the process progresses to Step ST5, and an evaporator temperature Ta (corresponding to the upper limit temperature needed for maintaining the stop of the engine 1 over the entire period of the vehicle stop duration) for preventing the engine 1 from being automatically restarted for the vehicle stop duration ti is calculated.

In calculating the evaporator temperature Ta, calculation is performed based on an increase amount of the evaporator temperature per unit time in the automatic stop state of the engine 1 in the S&S control during vehicle stop, the vehicle stop duration ti, the evaporator temperature at which the engine 1 is automatically restarted, and the like.

After the evaporator temperature Ta is calculated in the above-described manner, the process progresses to Step ST6, and in a case where it is assumed that coasting traveling is started, time t until the evaporator temperature reaches the temperature Ta (the evaporator temperature Ta for preventing the engine 1 from being automatically restarted for the vehicle stop duration ti).

In calculating time t, calculation is performed based on an increase amount of the evaporator temperature per unit time in the automatic stop state of the engine 1 in the S&S control during traveling, the current evaporator temperature, and the like.

Figure 5:
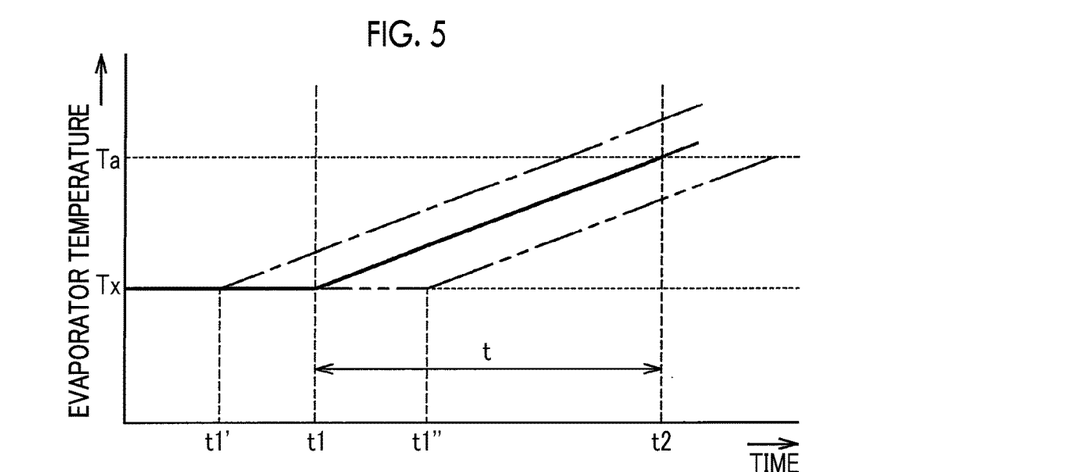
FIG. 5 is a timing chart showing an example of transition of an evaporator temperature accompanied with execution of S&S control during traveling.

FIG. 5 is a timing chart showing an example of transition of the evaporator temperature accompanied with the execution of the S&S control during traveling. In a solid line shown in FIG. 5, the current evaporator temperature is Tx, and in a case where automatic stop of the engine 1 is performed at timing t1 in the S&S control during traveling, the evaporator temperature becomes Ta at timing t2 after time t has elapsed. That is, in a case where the vehicle is stopped at timing t2, the evaporator temperature becomes Ta (the evaporator temperature for preventing the engine 1 from being automatically restarted during vehicle stop (the upper limit value of the evaporator temperature for preventing the engine 1 from being automatically restarted)) simultaneously with stop of the vehicle. As indicated by a one-dot-chain line in FIG. 5, in a case where automatic stop of the engine 1 is performed at timing t1' in the S&S control during traveling, the evaporator temperature at timing t2 (vehicle stop timing) exceeds Ta, and in this case, the engine 1 is automatically restarted during vehicle stop. As indicated by a two-dot-chain line in FIG. 5, in a case where automatic stop of the engine 1 is performed at timing t1" in the S&S control during traveling, the evaporator temperature at timing t2 (vehicle stop timing) falls below Ta. In this case, while the engine 1 is not automatically restarted during vehicle stop, an excessive cold and heat amount is stored in the evaporator 85, and the timing at which automatic stop of the engine 1 starts in the S&S control during traveling is delayed (even though the engine 1 is automatically stopped at a little earlier timing, the engine 1 is not automatically restarted during vehicle stop).

After time t is calculated in the above-described manner, the process progresses to Step ST7, and determination is made whether or not time t becomes equal to or longer than time is needed for vehicle stop used for calculation of the vehicle stop duration ti in Step ST4.

In a case where time t becomes equal to or longer than time ts needed for vehicle stop, even though the engine 1 is automatically stopped from the present time, thereafter, the cold and heat storage amount of the evaporator 85 at the time of vehicle stop is maintained to be equal to or greater than the required cold and heat storage amount (the evaporator temperature at the time of vehicle stop becomes equal to or lower than Ta), and determination is made that the stop of the engine 1 can be maintained over the entire period of the vehicle stop duration ti.

In a case where time t becomes shorter than time ts needed for vehicle stop, and in a case where the engine 1 is automatically stopped from the present time, thereafter, the required cold and heat storage amount is maintained as the cold and heat storage amount of the evaporator 85 at the time of vehicle stop (the evaporator temperature at the time of vehicle stop is lower than Ta), and determination is made that the engine 1 is automatically restarted in order to recover the cooling ability for the vehicle stop duration ti.

Accordingly, in a case where time t becomes equal to or longer than time ts needed for vehicle stop and determination is made to be YES in Step ST7, the process progresses to Step ST8, and coasting traveling (automatic stop of the engine 1) is executed.

In a state where coasting traveling is executed in the above-described manner, in the next routine, and in a case where the automatic stop release condition during traveling is established, determination is made to be NO in Step ST2, the process progresses to Step ST3, and coasting traveling is released. That is, the clutch 31 is engaged and the engine 1 is automatically restarted.

In a case where time t becomes shorter than time ts needed for vehicle stop and determination is made to be NO in Step ST7, the process progresses to Step ST3, and the coasting traveling is prohibited. That is, the engagement of the clutch 31 and the operation of the engine 1 are continuously returned.

The above operations are repeated. For this reason, the operation of Step ST4 is an example of the operation of predicting, by the electronic control unit, the vehicle stop duration (during traveling of the vehicle, predicts the vehicle stop duration when the vehicle is stopped after traveling of the vehicle). The operation of Step ST5 is an example of the operation of calculating, by the electronic control unit, the required cold and heat storage amount of the evaporator 85 (calculates the required cold and heat storage amount of the evaporator needed for maintaining the stop of the internal combustion engine over the entire period of the predicted vehicle stop duration). The operation of Step ST6 is an example of the operation of calculating, by the electronic control unit, the reaching time until the cold and heat storage amount of the evaporator 85 reaches the required cold and heat storage amount (during traveling of the vehicle, in a case where the internal combustion engine is automatically stopped, calculates the reaching time until the cold and heat storage amount of the evaporator reaches the required cold and heat storage amount). The prediction operation of time ts needed for vehicle stop performed in the Step ST4 is an example of the operation of predicting the time needed for vehicle stop (during traveling of the vehicle, the time needed for vehicle stop until the vehicle is stopped after traveling of the vehicle). The operations of Steps ST2, ST7, ST8 are example of the operations of automatically stopping, by the electronic control unit, the engine 1 during traveling of the vehicle (when the first condition is established during traveling of the vehicle, in a case where the calculated reaching time is equal to or longer than the predicted time needed for vehicle stop, automatically stops the internal combustion engine during traveling of the vehicle).

Figure 6:
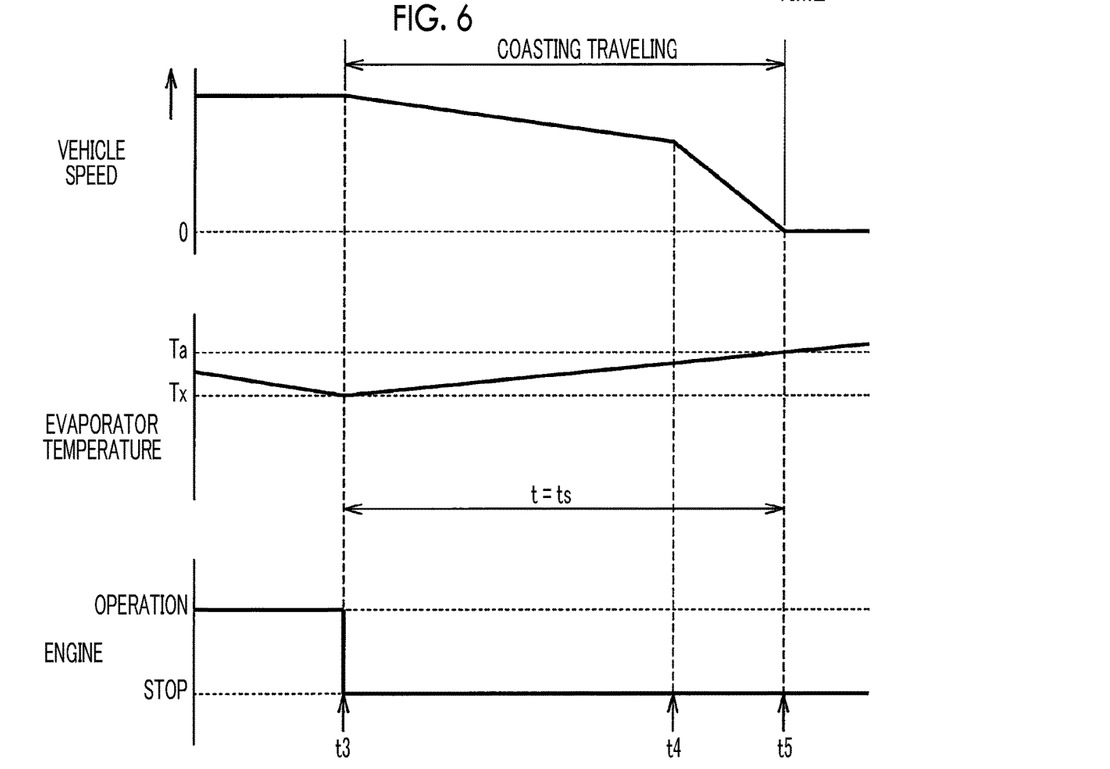
FIG. 6 is a timing chart showing an example of transition of each of a vehicle speed, an evaporator temperature, and an operation state of an engine in a case where S&S control during vehicle stop is executed after the execution of the S&S control during traveling.

FIG. 6 is a timing chart showing an example of transition of each of the vehicle speed, the evaporator temperature, and the operation state of the engine 1 in a case where the S&S control during vehicle stop is executed after the execution of the S&S control during traveling. In the timing chart shown in FIG. 6, a case where, from a state in which the calculated reaching time (the time until the evaporator temperature reaches the temperature Ta) t is shorter than the predicted time ts needed for vehicle stop, time t coincides with time ts needed for vehicle stop and coasting traveling is started is shown.

Figure 4:
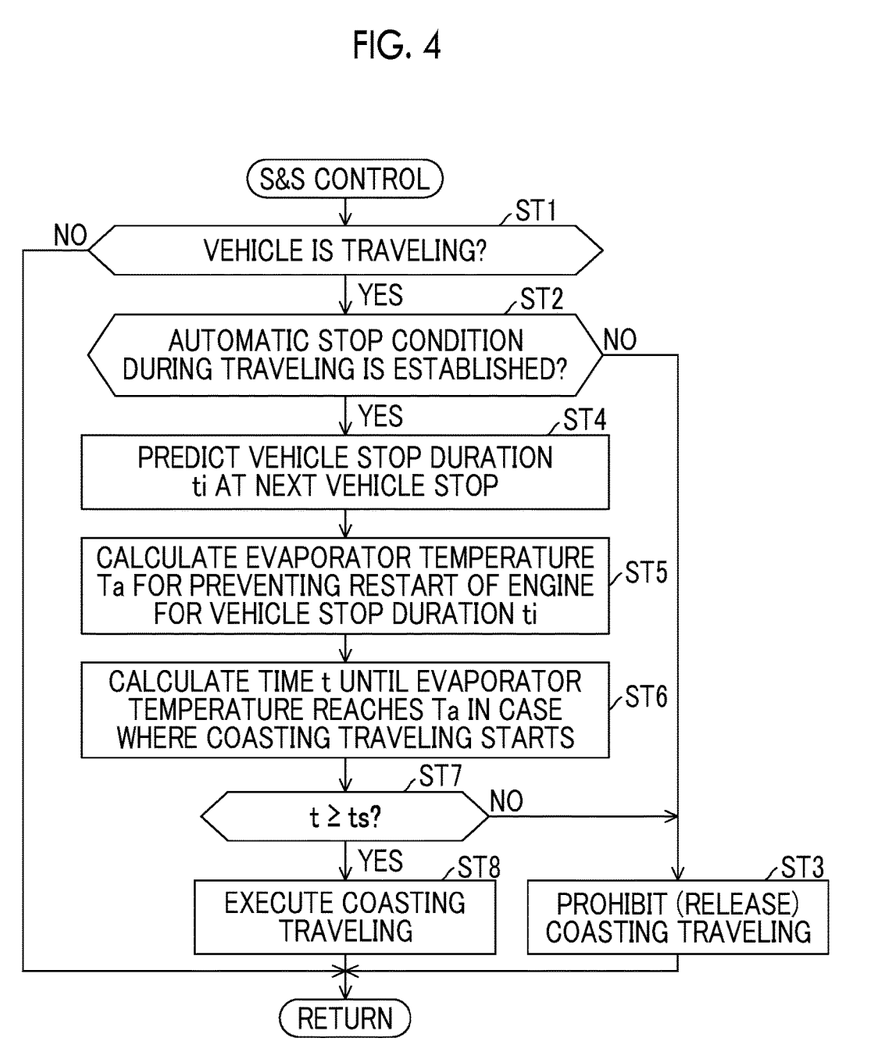
FIG. 4 is a flowchart illustrating a procedure of S&S control in a first embodiment.

At timing t3 in the drawing, automatic stop of the engine 1 in the S&S control during traveling is performed, and coasting traveling is started (a state in which, in the flowchart of FIG. 4, determination is made to be YES in Step ST7 and coasting traveling is started in Step ST8). While a depression operation of the brake pedal is performed at timing t4 and a deceleration of the vehicle increases, in the timing chart shown in FIG. 6, coasting traveling is continued. The vehicle is stopped at timing t5, and the evaporator temperature when the vehicle is stopped becomes Ta (the upper limit temperature needed for maintaining the stop of the engine 1 over the entire period of the vehicle stop duration ti). That is, the evaporator temperature at timing t3 is Tx, coasting traveling is started from timing t3, and the evaporator temperature becomes Ta at timing t5 at which the vehicle is stopped. That is, after the vehicle is stopped, while the engine 1 is automatically stopped in the S&S control during vehicle stop, the engine 1 is not automatically restarted during vehicle stop.

As described above, in the first embodiment, when the first condition is established during traveling of the vehicle, in a case where the calculated reaching time (in a case where it is assumed that coasting traveling is started, the time until the evaporator temperature reaches the temperature Ta) t is equal to or longer than the predicted time needed for vehicle stop (the time needed until the vehicle reaches the intersection) ts, the engine 1 is automatically stopped during traveling of the vehicle. That is, during traveling of the vehicle, even though the engine 1 is automatically stopped from the present time, thereafter, in a case where the cold and heat storage amount of the evaporator 85 at the time of vehicle stop is maintained to be equal to or greater than the required cold and heat storage amount, determination is made that the stop of the engine 1 can be maintained over the entire period of the vehicle stop duration ti, and the engine 1 is automatically stopped. With this, a possibility that the engine 1 is automatically restarted in the vehicle stop state is reduced, and it is possible to achieve improvement of the fuel consumption rate while meeting the cooling request. It is also possible to prevent the occupant from feeling a sense of discomfort due to sound, vibration, or the like accompanied with automatic restart of the engine 1 during stop of the vehicle.

As described referring to FIG. 6, in a case where coasting traveling is started when the calculated reaching time (the time until the evaporator temperature reaches the temperature Ta) t coincides with the predicted time is needed for vehicle stop, the cold and heat storage amount of the evaporator 85 when the vehicle is stopped substantially coincides with the required cold and heat storage amount of the evaporator 85 needed (needed at least) for maintaining the stop of the engine 1 over the entire period of the predicted vehicle stop duration ti. That is, it is possible to eliminate a shortage of the cold and heat storage amount of the evaporator 85 when the vehicle is stopped. For this reason, it is possible to maximize an automatic stop period of the engine 1 through the S&S control during traveling and to fully exhibit an improvement effect of the fuel consumption rate while preventing the engine 1 from being automatically restarted in the vehicle stop state.

Second Embodiment

A second embodiment will be described. In the second embodiment, during coasting traveling, in a case where the evaporator temperature exceeds Ta until the vehicle is stopped, the engine 1 is automatically restarted during traveling of the vehicle.

Figure 7:
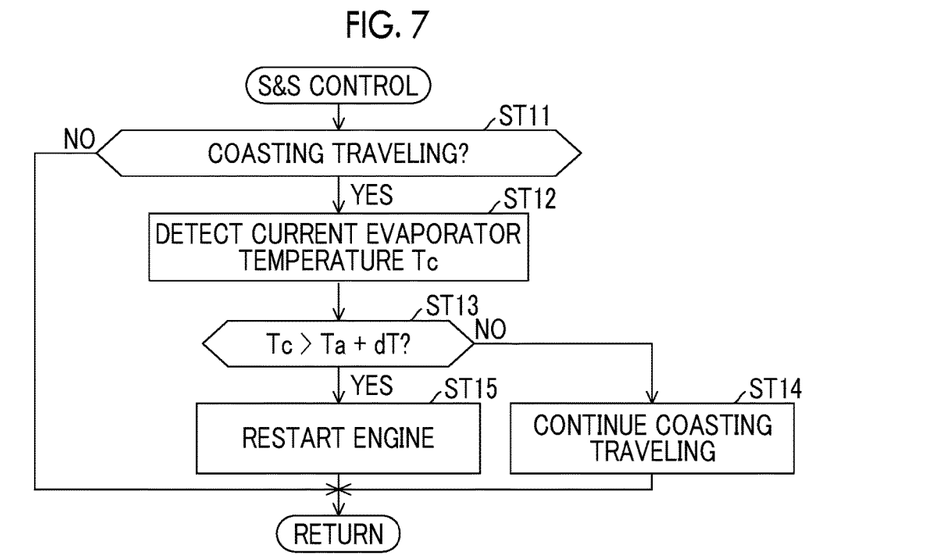
FIG. 7 is a flowchart illustrating a procedure of S&S control in a second embodiment.

FIG. 7 is a flowchart showing a procedure of the S&S control in the second embodiment. The flowchart is executed repeatedly at every predetermined time after the start switch of the vehicle is operated to be turned on.

In Step ST11, determination is made whether or not the vehicle is coasting traveling currently.

In a case where the vehicle is not coasting traveling and determination is made to be NO in Step ST11, determination is made that there is no need to determine whether or not to prohibit automatic stop of the engine 1 in the S&S control during traveling, and the process is returned as it is.

In a case where the vehicle is coasting traveling and determination is made to be YES in Step ST11, the process progresses to Step ST12, and a current evaporator temperature Tc is detected. The current evaporator temperature Tc is detected by the evaporator temperature sensor 113.

Thereafter, in Step ST13, determination is made whether or not Expression (2) is established.

$$Tc > Ta + dT \quad (2)$$

Here, dT is a temperature that, in a case where the current evaporator temperature Tc exceeds the evaporator temperature Ta, defines a deviation for automatically restarting the engine 1, and is set based on an experiment or a simulation as a value capable of decreasing the evaporator temperature to Ta within the time needed until the vehicle is stopped. For example, the time (time needed for vehicle stop) until the vehicle is stopped is predicted from a current position of the vehicle and a future stop position of the vehicle, and dT is obtained as the deviation of the temperature capable of decreasing the evaporator temperature to Ta for the time.

In a case where Expression (2) is not established and determination is made to be NO in Step ST13, the process progresses to Step ST14, and coasting traveling is continued. That is, determination is made that automatic restart of the engine 1 for decreasing the evaporator temperature is not yet needed, and coasting traveling is continued.

In a case where Expression (2) is established and determination is made to be YES in Step ST13, the process progresses to Step ST15, coasting traveling is stopped, and the engine 1 is automatically restarted. That is, at the current evaporator temperature Tc, thereafter, when the vehicle is stopped and the engine 1 is automatically stopped in the S&S control during vehicle stop, determination is made that the engine 1 is highly likely to be automatically restarted during vehicle stop, automatic restart of the engine 1 for decreasing the evaporator temperature is executed.

The above operations are repeated. For this reason, the operations of Steps ST13, ST15 are examples of the operations of controlling, by the electronic control unit, automatic restart (in the automatic stop state of the internal combustion engine through the first automatic stop control, in a case where the cold and heat storage amount of the evaporator becomes smaller than the required cold and heat storage amount of the evaporator needed for maintaining the stop of the internal combustion engine by a predetermined amount over the entire period of the predicted vehicle stop duration, performs automatic restart of the internal combustion engine during traveling of the vehicle).

Figure 8:
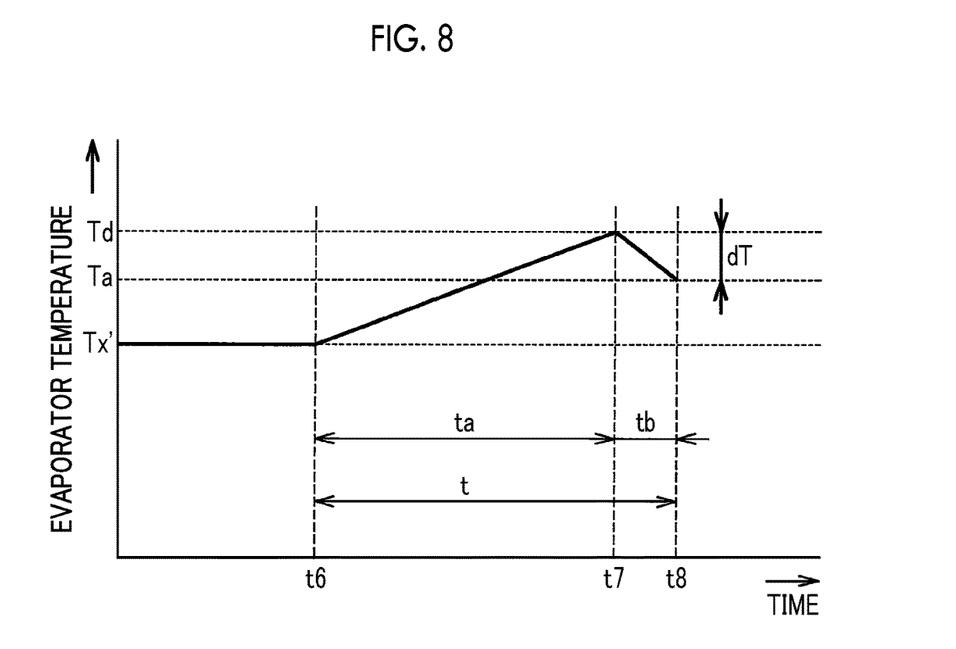
FIG. 8 is a timing chart showing an example of transition of an evaporator temperature accompanied with execution of S&S control during traveling in the second embodiment.

FIG. 8 is a timing chart showing an example of transition of the evaporator temperature accompanied with the execution of the S&S control during traveling in the second embodiment. At timing t6 in the drawing, automatic stop of the engine 1 in the S&S control during traveling is performed, and coasting traveling is started. At timing t7, the evaporator temperature becomes Td higher than Ta by a predetermined amount dT, automatic restart of the engine 1 is performed from when the evaporator temperature becomes Td, and circulation of the refrigerant in the refrigerant circulation circuit 8 of the air conditioner unit 6 is performed, such that the evaporator temperature decreases. At timing t8 at which the vehicle is stopped, the evaporator temperature becomes Ta. That is, in a state in which the engine 1 is automatically stopped in the S&S control during vehicle stop, the engine is not automatically restarted during vehicle stop. In FIG. 8, coasting traveling is performed in a period ta, and the evaporator temperature decreases with automatic restart of the engine 1 in a period tb. A decrease amount per unit time of the evaporator temperature for making the evaporator temperature be Ta at timing t8 at which the vehicle is stopped can be adjusted according to the air blow amount in the air conditioner unit 6, a pressure reduction amount of the refrigerant in the expansion valve 84, or the like.

According to the second embodiment, in the automatic stop state of the engine 1 in the S&S control during traveling, in a case where various conditions are changed (for example, the air conditioning request, the vehicle speed, and the like are changed), and in a case where the cold and heat storage amount of the evaporator 85 becomes smaller than the required cold and heat storage amount (the required cold and heat storage amount of the evaporator 85 needed for maintaining the stop of the engine 1 over the entire period of the predicted vehicle stop duration ti) by the predetermined amount, automatic restart of the engine 1 is performed during traveling of the vehicle, and the cold and heat storage amount of the evaporator 85 increases. With this, thereafter, at the time of vehicle stop, a possibility that the engine 1 is automatically restarted during vehicle stop is reduced, and it is possible to achieve improvement of the fuel consumption rate.

After coasting traveling is started as described above, in a case of control on an assumption that automatic restart of the engine 1 is performed until the vehicle is stopped, the evaporator temperature at which start of coasting traveling is permitted can be set to be higher than in the first embodiment (a case where coasting traveling is continued until the vehicle is stopped). In the timing chart shown in FIG. 8, the evaporator temperature at which start of coasting traveling is permitted is set to Tx' higher than in the first embodiment. In this case, it is possible to obtain the timing at which start of coasting traveling is permitted earlier than in the first embodiment, and it is possible to achieve further improvement of the fuel consumption rate.

Other Embodiments

Note that the embodiments disclosed herein are merely illustrative in all respects, and thus, does not serve as the ground for restrictive interpretation. Accordingly, the technical scope of the disclosure is not interpreted by the embodiments solely and is defined based on the claims. The technical scope of the disclosure includes all modifications falling within the claims and equivalents thereof.

For example, in the embodiments, although a case where the disclosure is applied to the vehicle mounted with the automatic transmission 3 has been described, the disclosure is not limited thereto, and may be applied to a vehicle mounted with a manual transmission. First condition in a vehicle mounted with a manual transmission is set so as to include, for example, a condition that a state in which any one of an accelerator pedal, a brake pedal, and a clutch pedal is not operated is continued for a predetermined time and a condition that a vehicle speed is equal to or higher than a predetermined value.

The S&S control according to the embodiments may be combined with each other. That is, after coasting traveling is performed in Step ST8 of the flowchart shown in FIG. 4 in the first embodiment, the process progresses to the flowchart shown in FIG. 7 in the second embodiment (in this case, determination is made to be YES in Step ST11), and a control operation of determining whether or not automatic restart of the engine 1 is needed according to the evaporator temperature is performed.

In the embodiments, the lighting state of the traffic signal and the information of the preceding vehicles are acquired by the inter-vehicle communication system. The disclosure is not limited thereto, and information may be acquired from an in-vehicle camera.

The disclosure can be applied to control for achieving improvement of the fuel consumption rate in a vehicle in which the engine can be automatically stopped during traveling of the vehicle and during vehicle stop.

In the control device according to the disclosure, the electronic control unit may be configured to automatically stop the internal combustion engine during traveling of the vehicle when the first condition is established in a state in which the calculated reaching time is less than the predicted time needed for vehicle stop and the calculated reaching time coincides with the predicted time needed for vehicle stop.

According to the above-mentioned configuration, the cold and heat storage amount of the evaporator when the vehicle is stopped substantially coincides with the required cold and heat storage amount of the evaporator needed (needed at least) for maintaining the stop of the internal combustion engine over the entire period of the predicted vehicle stop duration, and it is possible to eliminate a shortage of the cold and heat storage amount of the evaporator when the vehicle is stopped. For this reason, it is possible to maximize the automatic stop period of the internal combustion engine through the first automatic stop control and to fully exhibit an improvement effect of the fuel consumption rate while preventing the internal combustion engine from being automatically restarted in the vehicle stop state.

In the control device according to the disclosure, when a host vehicle is stopped according to a traffic signal in front of the host vehicle, the electronic control unit may be configured to predict a vehicle stop duration based on traffic signal information in front of the vehicle, position information and vehicle speed information of a host vehicle, and position information of another preceding vehicle.

During traveling of the vehicle, the vehicle stop duration when the vehicle is stopped after traveling of the vehicle, in particular, the signal waiting time when the vehicle is stopped according to the lamp color of the traffic signal changes according to the state of the traffic signal in front of the vehicle, the position and vehicle speed of the host vehicle, and the positions of other preceding vehicles. For this reason, the vehicle stop duration when the host vehicle is stopped according to the lamp color of the traffic signal in front is predicted based on information regarding the elements. That is, it is possible to estimate whether or not the lamp color of the traffic signal is "red" when the host vehicle reaches a position with the traffic signal, and in a case where the lamp color of the traffic signal is "red", the time from when the vehicle is stopped until the lamp color of the traffic signal is switched to "green" based on the traffic signal information (for example, the switching cycle of the lamp color of the traffic signal or the like) in front of the vehicle, the position information of the host vehicle, and the vehicle speed information of the host vehicle. It is possible to estimate the number of preceding vehicles that are stopped in a case where the host vehicle is stopped at the position with the traffic signal, and the timing at which the host vehicle starts in a case where the lamp color of the traffic signal is switched to "green" (a start delay time of the host vehicle from when the lamp color of the traffic signal is switched to "green") based on the position information of other preceding vehicles. With this, it is possible to accurately predict the vehicle stop duration.

In the control device according to the disclosure, in an automatic stop state of the internal combustion engine by the first automatic stop control, the electronic control unit may be configured to execute automatic restart of the internal combustion engine during traveling of the vehicle, when the cold and heat storage amount of the evaporator becomes smaller than the required cold and heat storage amount of the evaporator needed for maintaining the stop of the internal combustion engine over the entire period of the predicted vehicle stop duration by a predetermined amount.

According to the above-mentioned configuration, in the automatic stop state of the internal combustion engine through the first automatic stop control, in a case where various conditions are changed, and in a case where the cold and heat storage amount of the evaporator becomes smaller than the required cold and heat storage amount (the required cold and heat storage amount of the evaporator needed for maintaining the stop of the internal combustion engine over the entire period of the predicted vehicle stop duration) by the predetermined amount, automatic restart of the internal combustion engine is performed during traveling of the vehicle, and circulation of the refrigerant in the air conditioning device is performed to increase the cold and heat storage amount of the evaporator. With this, thereafter, when the vehicle is stopped, a possibility that the internal combustion engine is automatically restarted in the vehicle stop state is reduced, and it is possible to achieve improvement of the fuel consumption rate.

What is claimed is:

1. A control device for a vehicle that includes an internal combustion engine and an air conditioning device, the air conditioning device including a compressor and an evaporator, the compressor being configured to compress a refrigerant with power of the internal combustion engine, and the evaporator being configured to perform heat exchange between the refrigerant and air,
the control device comprising
an electronic control unit configured to:
execute a first automatic stop control when a first condition is established during traveling of the vehicle, the first automatic stop control being a control for automatically stopping the internal combustion engine during traveling of the vehicle;
execute a second automatic stop control when a second condition is established during stop of the vehicle, the second automatic stop control being a control for automatically stopping the internal combustion engine during stop of the vehicle;
during traveling of the vehicle, predict a vehicle stop duration when the vehicle is stopped after traveling of the vehicle;
calculate a required cold and heat storage amount of the evaporator needed for maintaining the stop of the internal combustion engine over an entire period of the predicted vehicle stop duration;
during traveling of the vehicle, calculate a reaching time until a cold and heat storage amount of the evaporator reaches the required cold and heat storage amount, when the internal combustion engine is automatically stopped;
during traveling of the vehicle, predict a time needed for vehicle stop until the vehicle is stopped after traveling of the vehicle; and
automatically stop the internal combustion engine during traveling of the vehicle, when the first condition is established during traveling of the vehicle and the calculated reaching time is equal to or longer than the predicted time needed for vehicle stop.

2. The control device according to claim 1, wherein the electronic control unit is configured to automatically stop the internal combustion engine during traveling of the vehicle when the first condition is established in a state in which the calculated reaching time is less than the predicted time needed for vehicle stop and the calculated reaching time coincides with the predicted time needed for vehicle stop.

3. The control device according to claim 1, wherein when a host vehicle is stopped according to a traffic signal in front of the host vehicle, the electronic control unit is configured to predict the vehicle stop duration based on traffic signal information in front of the vehicle, position information and vehicle speed information of the host vehicle, and position information of another preceding vehicle.

4. The control device according to claim 1, wherein in an automatic stop state of the internal combustion engine by the first automatic stop control, the electronic control unit is configured to execute automatic restart of the internal combustion engine during traveling of the vehicle, when the cold and heat storage amount of the evaporator becomes smaller than the required cold and heat storage amount of the evaporator needed for maintaining the stop of the internal combustion engine over the entire period of the predicted vehicle stop duration by a predetermined amount.

5. A control method for a vehicle that includes an internal combustion engine, an air conditioning device, and an electronic control unit, the air conditioning device including a compressor and an evaporator, the compressor being configured to compress a refrigerant with power of the internal combustion engine, the evaporator being configured to perform heat exchange between the refrigerant and air, the control method comprising:

executing, by the electronic control unit, first automatic stop control for automatically stopping the internal combustion engine when a first condition is established during traveling of the vehicle;

executing, by the electronic control unit, second stop control for automatically stopping the internal combustion engine when a second condition is established during stop of the vehicle;

during traveling of the vehicle, predicting, by the electronic control unit, a vehicle stop duration when the vehicle is stopped after traveling of the vehicle;

calculating, by the electronic control unit, a required cold and heat storage amount of the evaporator needed for maintaining the stop of the internal combustion engine over an entire period of the predicted vehicle stop duration;

during traveling of the vehicle, calculating, by the electronic control unit, a reaching time until a cold and heat storage amount of the evaporator reaches the required cold and heat storage amount, when the internal combustion engine is automatically stopped;

during traveling of the vehicle, predicting, by the electronic control unit, a time needed for vehicle stop until the vehicle is stopped after traveling of the vehicle; and automatically stopping, by the electronic control unit, the internal combustion engine during traveling of the vehicle, when the first condition is established during traveling of the vehicle and the calculated reaching time is equal to or longer than the predicted time needed for vehicle stop.

* * * * *